US008126326B2

(12) United States Patent
Lázaro Villa et al.

(10) Patent No.: US 8,126,326 B2
(45) Date of Patent: Feb. 28, 2012

(54) METHOD AND DEVICE FOR COMPLEX ANALYSIS OF OPTICAL SPECTRUMS

(75) Inventors: Jose Antonio Lázaro Villa, Barcelona (ES); Asier Villafranca Velasco, Valtierra (ES); Juan Ignacio Garcés Gregorio, Saragossa (ES); Iñigo Salinas Ariz, Saragossa (ES); Francisco Manuel López Torres, Saragossa (ES)

(73) Assignees: Fibercom S.L., Zaragoza (ES); Aragon Photonics Labs, S.L., Zaragoza (ES)

( * ) Notice: Subject to any disclaimer, the term of this patent is extended or adjusted under 35 U.S.C. 154(b) by 669 days.

(21) Appl. No.: 12/301,141

(22) PCT Filed: May 17, 2006

(86) PCT No.: PCT/ES2006/000257
§ 371 (c)(1),
(2), (4) Date: Jan. 30, 2009

(87) PCT Pub. No.: WO2007/132030
PCT Pub. Date: Nov. 22, 2007

(65) Prior Publication Data
US 2009/0208202 A1 Aug. 20, 2009

(51) Int. Cl.
*H04B 10/08* (2006.01)
(52) U.S. Cl. ........... 398/16; 398/17; 398/30; 398/33; 398/93
(58) Field of Classification Search ........... 398/16–17, 398/30, 33
See application file for complete search history.

(56) References Cited

U.S. PATENT DOCUMENTS

| | | | | |
|---|---|---|---|---|
| 4,984,884 A | * | 1/1991 | Ryu et al. | 356/73.1 |
| 5,764,359 A | * | 6/1998 | Lyu et al. | 356/477 |
| 2003/0174924 A1 | * | 9/2003 | Tennyson | 385/12 |

* cited by examiner

*Primary Examiner* — Dung Nguyen
(74) *Attorney, Agent, or Firm* — Sughrue Mion, PLLC

(57) ABSTRACT

This invention relates to a device and associated process capable of obtaining the optical spectrum phase of an optical signal or test signal to be analyzed using techniques for heterodyning between two monochromatic spectral components simultaneously extracted from the test signal itself by means of stimulated Brillouin scattering.

17 Claims, 3 Drawing Sheets

METHOD AND DEVICE FOR COMPLEX ANALYSIS OF OPTICAL SPECTRUMS

FIELD OF THE ART

This invention relates to a device and an associated process capable of obtaining the optical spectrum phase of an optical signal or test signal to be analyzed by using techniques of heterodyning between two monochromatic spectral components simultaneously extracted from the test signal itself by means of stimulated Brillouin scattering.

STATE OF THE ART

European patent document EP-A1-1519171, also published as US2005/0068533A1, describes a process of complex analysis of an optical spectrum, and therefore of its phase, by means of heterodyning between a local optical oscillator and the selected component of the analyzed optical spectrum, and includes a review of the state of the art along this optical spectrum analysis line.

Patent U.S. Pat. No. 5,146,359 B1 describes a double-stage phase-diversity receiver that divides one signal into a plurality of signals which are in turn mixed with signals from local oscillators and finally processed and mixed again, including a final demodulation step and a process of heterodyning the signals to compensate for the distortion due to a delay produced in some groups of optical fiber conductors of said signals.

International patent document WO 2004/044538 describes a device for optical spectra analysis by stimulated Brillouin scattering (SBS) and an associated measurement method using the optical amplification of the signals caused by the Brillouin scattering effect itself and particularly the selective optical amplification of a determined component of the optical spectrum of the signal to be analyzed, or test signal.

BRIEF EXPLANATION OF THE INVENTION

This invention is characterized by obtaining the optical spectrum phase of a test signal (SUT) by means of heterodyning between two different components (DOS) of said spectrum simultaneously obtained by means of stimulated Brillouin scattering (SBS).

The device object of this patent consists of a basic version of five differentiated elements that are illustrated in FIG. 1 of the drawings:

a) an optical source (SUR) capable of providing a signal formed by two monochromatic lines (DMS) that can move along the spectral range which is intended to be measured and in which the difference of their wavelengths (YY) is controlled, b) a high resolution optical spectrum analyzer based on stimulated Brillouin scattering (SBS) capable of allowing interaction between the analyzed optical signal (SUT) and the double monochromatic signal (DMS) generated by the optical source (SUR).

c) a photoelectric detection system (HF) in which the heterodyne effect between the two spectral components (DOS) occurs and which provides an electrical signal (DES) having a frequency proportional to the wavelength difference and a phase proportional to the phase difference of the two spectral components obtained from the test signal (SUT), d) an electric phase analyzer (EPA) which allows extracting the phase information of the test signal (SUT) contained in the detected electrical signal (DES), and e) a data processing unit (CPU) processing the signals and controlling the different elements of the device; this unit can further handle other parameters in order to provide more complete information of the analyzed optical signal (SUT). Specifically, if the amplitude of the test signal (SUT) is obtained from element b) or from an external device for example, complete and complex information of the spectrum can be obtained, which allows knowing the temporal evolution of the test problem (SUT) and of all modulations thereof, both in amplitude, phase and frequency and in any of their possible combinations.

The process according to the invention consists of the following steps:

generating a double monochromatic optical probe signal (DMS) in wavelengths $\lambda_1$ and $\lambda_2$, at a controlled spectral distance $\Delta\lambda$ by means of an optical source (SUR) from at least one tunable laser source (TLS);

introducing said optical signal (DMS) and an optical test signal (SUT) in an optical spectrum analyzer in which they interact by stimulated Brillouin scattering (SBS) producing a diffused optical signal (DOS) at the output of said optical spectrum analyzer, formed by two components centered on $\lambda_1+\Delta\lambda_D$ and $\lambda_2+\Delta\lambda_D$, $\Delta\lambda_D$ being the characteristic Doppler shift of the stimulated Brillouin effect (SBS);

leading said double diffused optical signal (DOS) to a photoelectric detector (HF), which generates an electrical signal with a main frequency $(Y_1)$ proportional to the wavelength difference $\Delta\lambda$ of the double monochromatic signal (DMS) acting as a probe and a phase $\Phi$ proportional to the phase difference of the two components of the diffused optical signal (DOS); and measuring and registering said phase $\Phi$ by an electric phase analyzer (EPA).

DETAILED EXPLANATION OF THE INVENTION

Figure 1:
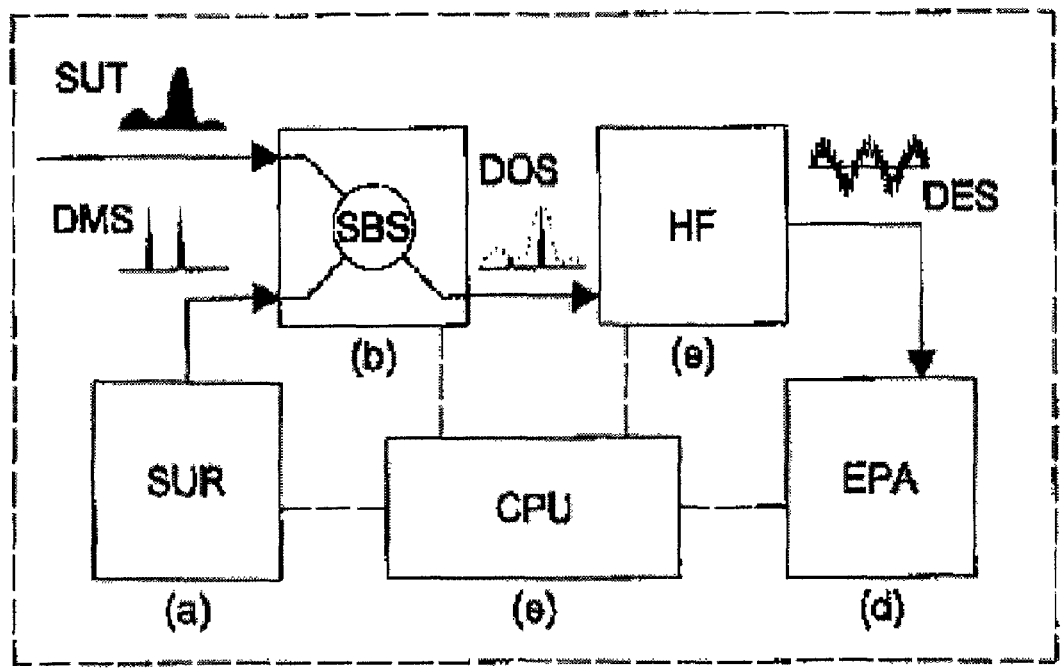
FIG. 1 is a diagram showing the components forming the device in a preferred embodiment.

The spectral composition of an optical signal can be achieved by measuring the scattered beam resulting from the stimulated Brillouin (SBS) interaction between an optical signal (SUT) intended to be measured and a highly monochromatic reference signal (probe signal). A spectral analysis in amplitude of the test signal with a resolution less than the picometer in the near infrared region is obtained by varying the wavelength of the probe signal. This device, as well as its associated measuring technique, is described in international patent document WO 2004/044538 and corresponds to element b) of FIG. 1.

If a probe signal made up of 2 spectral lines (DMS) is used instead of using a single monochromatic probe signal, after Brillouin (SBS) interaction with the test signal (SUT), a diffused optical signal (DOS) is generated which is formed by two spectral lines maintaining the same wavelength difference between each other as the 2 spectral lines of the probe signal (DMS).

This double diffused optical signal (DOS) generates an electrical signal (DES) having a frequency proportional to the wavelength difference and a phase proportional to the phase difference of the two spectral components of the diffused signal (DOS) by heterodyning in a photodetector (HF).

In other words this invention is based on using the Brillouin scattering effect to select two spectral components and measure the optical phase difference between them by means of a heterodyning effect thereof.

The advantage that this solution provides for measuring the optical spectrum phase is based on making use of the good properties of the Brillouin scattering effect to select two spectral components with high resolution and signal level.

To obtain the phase of the detected electrical signal (DES) it is necessary to have an electric phase analyzer (EPA) that extracts the information corresponding to the phase of the diffused optical signal (DOS) and therefore of the test signal (SUT).

Therefore the device to put the invention into practice comprises:
a) an optical source (SUR) generating a reference or probe optical signal, formed by two controlled spectrum separation monochromatic lines (DMS) with the ability to move along the spectral range to be measured;
b) a high resolution optical spectrum analyzer based on stimulated Brillouin scattering (SBS), in which a test signal (SUT) to be measured and the two monochromatic lines of the probe signal (DMS) interact with each other, producing, due to the stimulated Brillouin scattering (SBS) effect, a diffused optical signal (DOS) formed by two spectral lines;
c) a photoelectric detection system (HF) in which a heterodyne effect between said two spectral components (DOS) is produced and which provides a detected electrical signal (DES) at its output;
d) a module acting as an electric phase analyzer (EPA) to extract the phase information from the mentioned test signal (SUT) contained in said detected electrical signal (DES); and
e) a data processing unit (CPU) to process signals and control different elements of the device.

According to the principles of the invention, the mentioned optical source is adapted to control the difference (YY) between the wavelengths of said two generated monochromatic lines (DMS).

Figure 2:
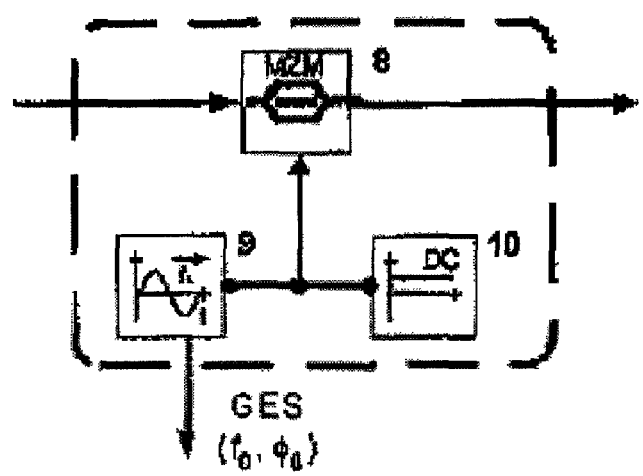
FIG. 2 shows an external electro-optic modulator used as double monochromatic signal source (SUR).
Figure 3:
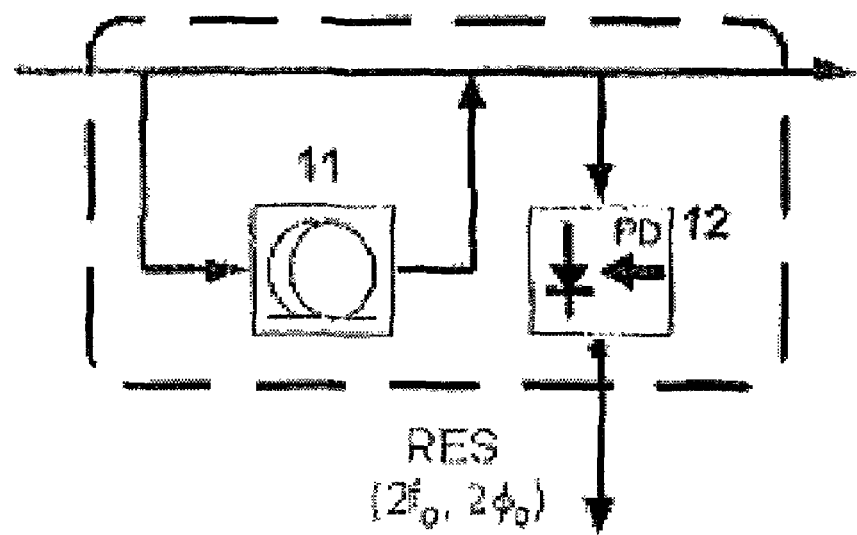
FIG. 3 shows a first alternative solution to obtain said double monochromatic signal source (SUR) consisting of the use of an Asymmetric Passive Mach-Zehnder Interferometer.
Figure 4:
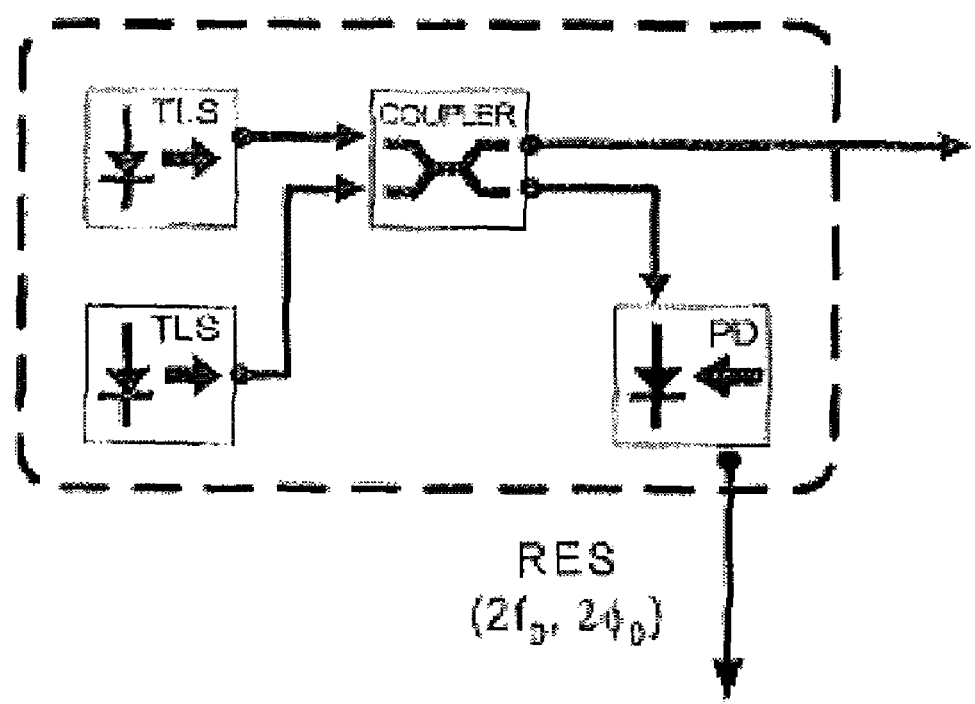
FIG. 4 shows a second alternative solution based on synchronizing two tunable lasers and controlling the wavelength difference of their emissions.

To generate the double probe signal (DMS) and to extract the phase information in the electric phase analyzer (EPA), the following possible techniques are proposed:
A.—A double monochromatic signal source (SUR) (Element A).
A1: Using an external electro-optic modulator directed by an electrical signal (GES). In suitable operating conditions, two spectral lines distinguished and separated by a double frequency from the frequency of the electrical signal (GES) directing the modulator are achieved. FIG. 2.
A2: Injecting a monochromatic signal from a tunable laser into an Asymmetric Passive Mach-Zehnder Interferometer and adjusting the time-of-flight difference along the two arms of the interferometer to achieve two spectral lines the separation of which in wavelengths depends on the scanning speed of the tunable laser. FIG. 3.
A3: Synchronizing two tunable lasers so that the wavelength difference of their emissions is maintained constant throughout the scanning. FIG. 4.
B.—Electric Phase Analyzer (EPA).
B1: Analysis techniques using a reference electrical signal (RES) with which to compare the detected electrical signal (DES).
B1a: Using the electrical signal (GES) directing the modulator as a reference signal (RES). This technique can only be applied together with A1.

Figure 5:
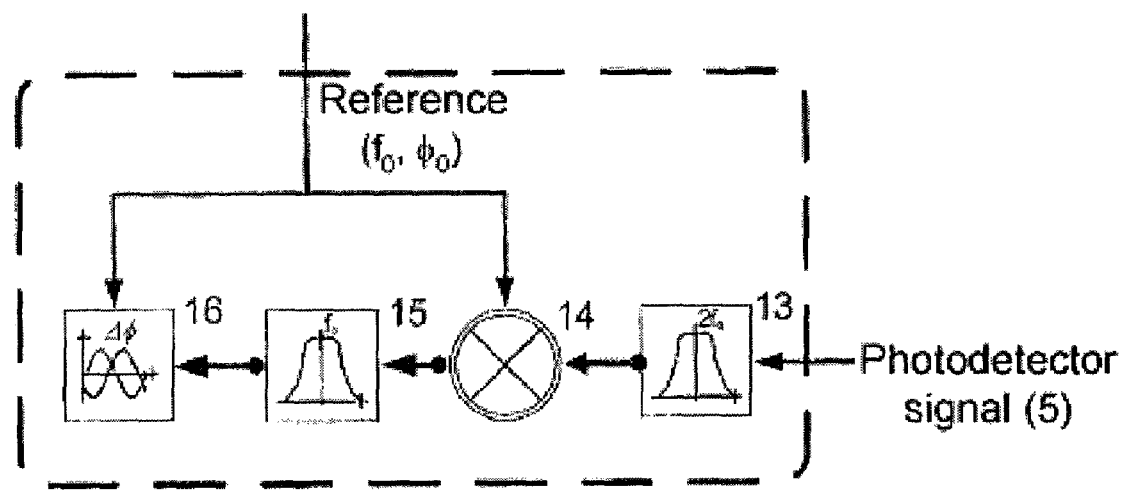
FIGS. 5 and 6 show implementations of the electric phase analyzer (element d) of the components of the device.
Figure 6:
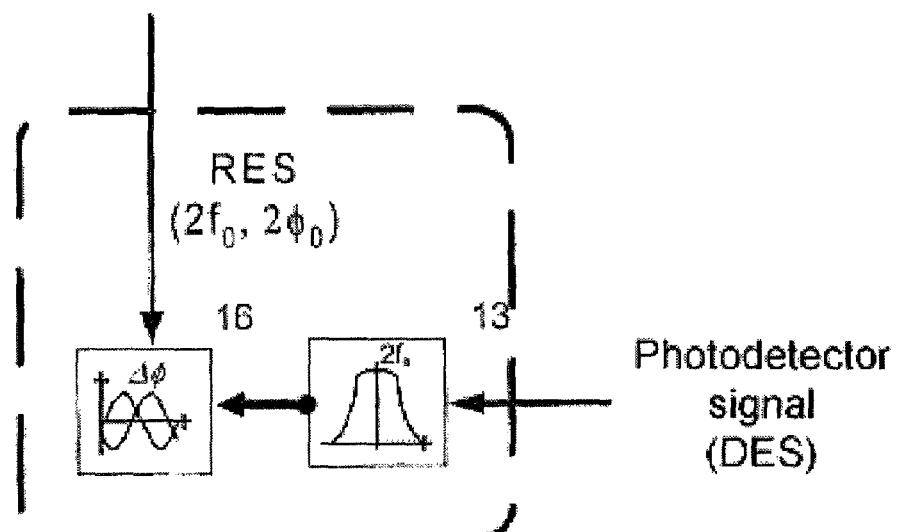

This detection technique is characterized in that the frequency of the reference signal (RES) is half the frequency of the detected electrical signal (DES). In order to be able to compare both signals, the frequency of the detected electrical signal (DES) is converted into the frequency of the reference signal (RES) without losing phase information (FIG. 5) or the frequency of the reference signal (RES) is duplicated (FIG. 6).

B1b: Obtaining the reference signal (RES) from the double monochromatic signal (DMS) by diverting part of its power to an independent photodetector (IP).

In this detection technique, the detected electrical signal (DES) containing the information coincides in frequency with the reference signal (RES) and the sought phase information is obtained by comparing signals with the same frequency. FIG. 7.

B2: Analysis techniques based on analog-digital conversion and signal processing, using to that end programmable logic devices such as FPGA, DSP or any other device allowing conversions between digital and analog signals and their numerical processing. In this case, the phase could be obtained by processing the detected electrical signal (DES) after being digitalized.

The devices obtained by combining these techniques, with their corresponding elements or associated equipment, with a device allowing stimulated Brillouin (SBS) interaction (element b) and a photoelectric detector element (HF) (element c), capable of providing heterodyning between two spectral components (DOS), allow measuring the spectral phase of optical signals (SUT).

In addition to what is explained herein, if in addition to the phase information of the spectrum of the optical test signal (SUT), the information regarding its amplitude is available, a complete measurement of the optical spectrum can be achieved, obtaining both the real part and the imaginary part thereof (complex spectrum).

This complex spectrum of the optical signal (SUT) can be analyzed by the data processing unit (CPU) (element e) of the devices by means of numerical transformation techniques, for example IFFT, with the aim of obtaining information of the temporary evolution of the test signal and of all modulations thereof, both in amplitude, phase and frequency and of any of their possible combinations.

The invention claimed is:
1. A device for the analysis of the optical spectrum phase comprising:
a) an optical source (SUR) generating an optical probe signal formed by at least two controlled spectrum separation monochromatic lines (DMS) that can move along the spectral range to be measured;
b) a high resolution optical spectrum analyzer based on stimulated Brillouin scattering (SBS) in which a test signal (SUT) to be measured and said at least two monochromatic lines of the probe signal (DMS) interact with each other, producing a diffused optical signal (DOS) formed by two spectral lines;

c) a photoelectric detection system (HF) in which a heterodyne effect between said at least two spectral components (DOS) occurs and which provides at its output a detected electrical signal (DES);

d) a module acting as an electric phase analyzer (EPA) for extracting the phase information of the mentioned test signal (SUT) contained in said detected electrical signal (DES); and e) a data processing unit (CPU) for processing the signals and controlling the different elements of the device.

2. A device according to claim 1, characterized in that said optical source (SUR) is adapted to control the wavelength difference (YY) of said at least two generated monochromatic lines (DMS).

3. A device according to claim 1, characterized in that said generating source (SUR) of a double monochromatic optical signal (DMS) is adapted to duplicate said optical probe signal generated by a tunable laser source (TLS), including to that end an optical signal modulator controlled by an electrical reference signal (GES) generated by a sinusoidal electrical signal generator adapted to further receive continuous electrical signals or sinusoidal signal rectifications from sources included in the device or external to it in order to suitably establish the operating point of said modulator such that a double monochromatic probe signal (DMS) is produced.

4. A device according to claim 3, characterized in that the generating source (SUR) of a double monochromatic optical signal (DMS) is formed by one or more tunable laser sources (TLS) tuned by any means to keep the spectral separation between the two monochromatic lines (DMS) constant along the spectral range to be measured.

5. A device according to claim 3, characterized in that it includes a Mach-Zehnder type electro-optic modulator (MZM) applied to the duplication of the spectrum of the mentioned tunable laser source (TLS).

6. A device according to claim 3, characterized in that said electrical phase analyzer (EPA) includes several electronic components carrying out a conversion of the frequency of said detected electrical signal (DES) obtained from the photodetector (HF) at the same frequency as the reference signal (GES) and a phase $\Phi$ proportional to the phase difference of the two spectral components of the double diffused optical signal (DOS) and further comprises a device for measuring the phase between two electrical signals of the same frequency.

7. A device according to claim 6, characterized in that it includes electrical frequency mixers and/or electrical filters for filtering out unwanted signals, applied to the conversion of the frequency of said detected electrical signal (DES) obtained from the photodetector (HF) to the frequency of said reference signal (GES).

8. A device according to claim 6, characterized in that it includes programmed DSP and/or FPGA devices applied to the conversion of the frequency of said detected electrical signal (DES) obtained from the photodetector (HF) to the frequency of the reference signal (GES) and/or to the detection of phase between said two electrical signals (DES) and (GES).

9. A device according to claim 8, characterized in that at least one of said DSP or FPGA devices is applied to the generation of said reference electrical signal (GES).

10. A device according to claim 3, characterized in that it includes a detector to which part of the power of said double monochromatic probe signal (DMS) is deviated for the generation of said reference electrical signal (GES).

11. A device according to claim 1, characterized in that the device includes means for generating an electrical signal: sinusoidal, square, PRBS signal, etc. with which an external signal source is modulated to generate the optical test signal (SUT).

12. A method for obtaining the optical spectrum phase by means of a device according to claim 1, characterized by the following steps:

generating a double monochromatic optical probe signal (DMS) in wavelengths $\lambda_1$ and $\lambda_2$, at a controlled spectral distance $\Delta\lambda$ by means of an optical source (SUR) from at least one tunable laser source (TLS);

introducing said optical signal (DMS) and an optical test signal (SUT) in an optical spectrum analyzer in which they interact by stimulated Brillouin scattering (SBS) producing a diffused optical signal (DOS) at the output of said optical spectrum analyzer, formed by two components centered on $\lambda_1+\Delta\lambda_D$ and $\lambda_2+\Delta\lambda_D$, $\Delta\lambda_D$ being the characteristic Doppler shift of stimulated Brillouin scattering (SBS);

leading said double diffused optical signal (DOS) to a photoelectric detector (HF), which generates an electrical signal with a main frequency ($Y_1$) proportional to the wavelength difference $\Delta\lambda$ of the double monochromatic signal (DMS) acting as a probe and a phase $\Phi$ proportional to the phase difference of the two components of the diffused optical signal (DOS); and measuring and registering said phase $\Phi$ by an electric phase analyzer (EPA).

13. A method according to claim 12, characterized by simultaneously or alternatively carrying out an analysis of the amplitude of the optical spectrum generated by said test signal (SUT) based on stimulated Brillouin scattering (SBS) by means of power dividers or switches.

14. A method according to claim 12, characterized in that the data obtained by the electrical phase analyzer (EPA) are acquired, and the complex spectrum, the real and imaginary part or the modulus and phase, or equivalent, of the optical spectrum of the test signal (SUT) is calculated by means of a data processing unit (CPU).

15. A method according to claim 12, characterized in that the temporal evolution of the test signal (SUT) is sampled, i.e. amplitude, power, phase, chirp or a combination of these magnitudes of the test signal (SUT) is analyzed over time.

16. A method according to claim 12, characterized in that the double monochromatic signal (DMS) is obtained by introducing the optical signal generated by the tunable laser source (TLS) in linear wavelength scan mode in an Asymmetric Passive Mach-Zehnder Interferometer (MZI) such that the signal is transmitted by sections having a different delay, two monochromatic spectral components the spectral distance of which is proportional to the delay difference and the scanning speed of the tunable laser source (TLS) being obtained at the output.

17. A method according to claim 12, characterized by obtaining the temporal evolution of the optical test signal (SUT) by means of numerical processing of the complex spectrum of the signal by means of programmed DSP, FPGA devices or a computer.

* * * * *